Figure 1:
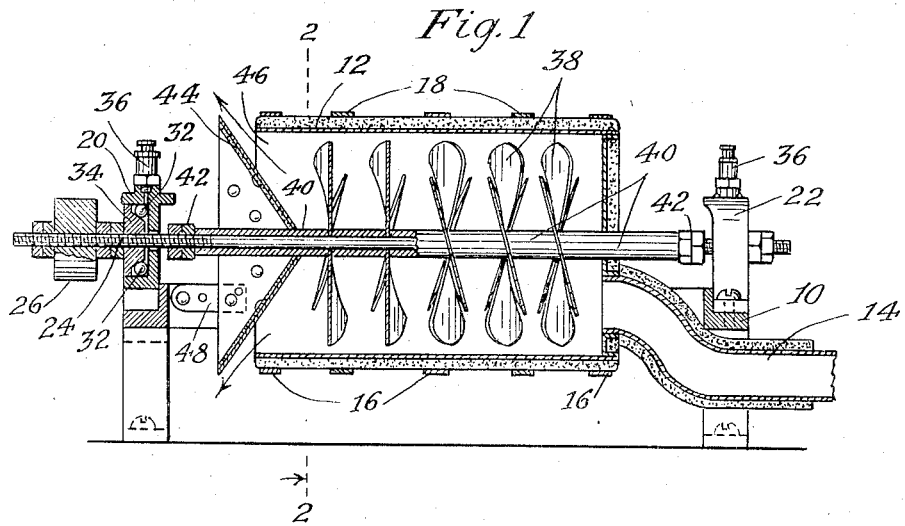

G. A. BLAIN AND J. SCHERER.
EXHAUST MUFFLER.
APPLICATION FILED APR. 17, 1918.

1,344,976.

Patented June 29, 1920.

Inventors:
George A. Blain.
Jacob Scherer
By Whiteley and Ruckman
their Attorneys.

UNITED STATES PATENT OFFICE.

GEORGE A. BLAIN AND JACOB SCHERER, OF LONG LAKE, MINNESOTA.

EXHAUST-MUFFLER.

1,344,976.  Specification of Letters Patent.  Patented June 29, 1920.

Application filed April 17, 1918. Serial No. 229,167.

*To all whom it may concern:*

Be it known that we, GEORGE A. BLAIN and JACOB SCHERER, citizens of the United States, residing at Long Lake, in the county of Hennepin and State of Minnesota, having invented certain new and useful Improvements in Exhaust-Mufflers, of which the following is a specification.

Our invention relates to exhaust mufflers intended for use in connection with internal combustion engines either for automobiles or as stationary engines. The object is to provide an efficient muffler which will not only soften the noise of the exhaust but will prevent clogging, will increase the efficiency of the engine and will tend to keep down heat in the cylinders. A further object is to provide a muffler having fans in which the bearings for the fan axle will not heat and bind.

The full objects and advantages of our invention will appear in connection with the detailed description thereof and are particularly pointed out in the claims.

Referring to the drawings, which illustrate the application of our invention in one form,—

Figure 2:
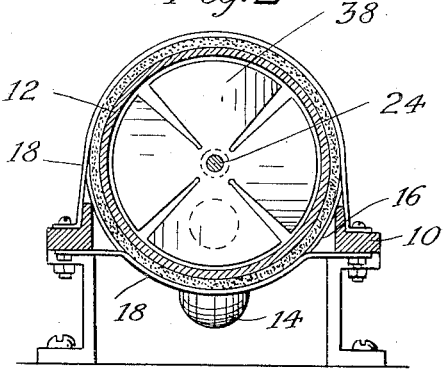
Figure 3:
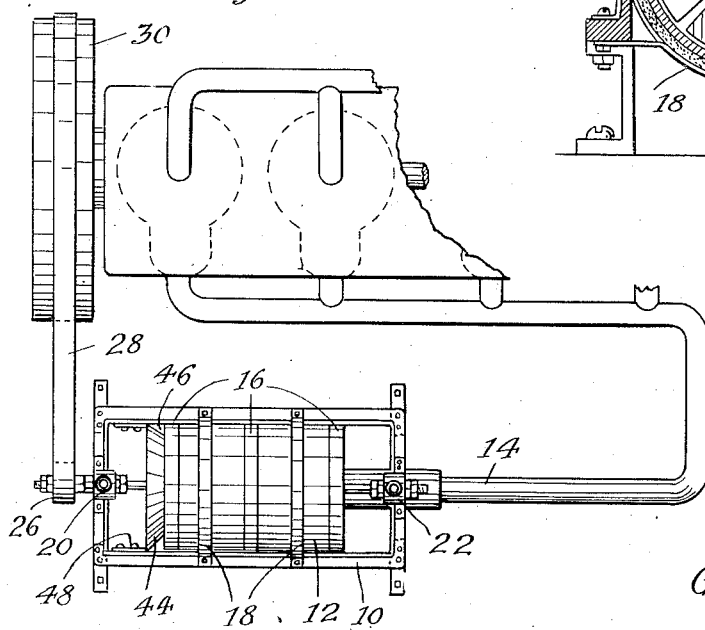

Figure 1 is a view mostly in central longitudinal section. Fig. 2 is a section on the line 2—2 of Fig. 1. Fig. 3 is a top plan view showing one way of connecting the muffler with an internal combustion engine.

10 designates a suitable frame for supporting the muffler which includes a cylinder 12 into one end of which is led the exhaust pipe 14 from the engine. The portion of this pipe adjacent the cylinder 12 is preferably covered with asbestos. The cylinder forms an expansion chamber and is preferably made from sheet metal having an asbestos covering held in place by straps 16 passing around the cylinder. The muffler is securely fastened to the frame by straps 18. Mounted in bearings 20 and 22 on the frame is a shaft 24 to which is secured a pulley 26 driven by a belt 28 from the fly wheel 30 on the engine shaft. It is, of course, obvious that the shaft 24 can be driven by any suitable connection with a moving part of the engine. The bearings 20 and 22 are not only provided with balls 32 to coöperate with cones 34 on the shaft, but are also provided with oil cups 36. The shaft extends axially through the cylinder 12 and is provided with a plurality of fans 38 of ordinary construction which are held on the shaft by sleeves 40 extending between the hub portions and clamped firmly thereto by lock nuts 42 on the shaft. A conical deflector 44 is secured to the frame by brackets 48. The deflector preferably consists of sheet metal covered on the rear, which is the inner surface of the cone, with asbestos, and is so positioned as to form an annular slit 46 for the escape of gases from the muffler.

The operation and advantages of our muffler will be obvious from the foregoing description. The cylinder 12 constitutes an expansion chamber into which the gases discharged from the engine are sucked by the fans which force the gases out of the annular slit 46. By means of this construction not only do we obtain efficient muffling of the exhaust, but the fans cause a sucking action which draws the products of combustion out of the cylinders of the engine at the time of exhaust, and the avoidance of back pressure at that time results in an increased efficiency of the engine. The deflector 44 prevents the heated gases from striking the rear bearing 20 and causes a current of cool air to circulate past this bearing toward the center of the cone, thereby keeping said bearing cool. Both bearings for the fan shaft are provided with balls and oil cups which aid in increasing the efficiency of the device. The suction caused by the fans quickly removes the burned gases from the engine cylinders, and not only prevents clogging but acts to keep down the heat in the cylinders, as demonstrated by tests which we made with a two and one-half horse power gasolene engine as follows. We used two gallons of water in a three gallon jacket at a temperature of fifty degrees Fahrenheit at the time of starting. After running one hour with our muffler the water showed a temperature of one hundred and seventy-two degrees Fahrenheit, or a rise in temperature of one hundred and twenty-two degrees Fahrenheit. A test made under the same conditions except that the engine was allowed to exhaust into the open air, at the end of one hour showed a temperature of one hundred and ninety-eight degrees Fahrenheit, or a rise in temperature of one hundred and forty-eight degrees Fahrenheit. A test made under the same conditions except that an ordinary muffler was used, at the end of one hour showed a temperature of two hundred and eight degrees Fahrenheit, or a rise of temperature of one hundred and fifty-eight degrees Fahrenheit. When the above tests were made the engine was pumping water from a one hundred and ten foot well with a ten foot lift.

We claim:

1. An exhaust muffler comprising a casing, an exhaust pipe connecting one end of said casing with an engine, a shaft extending axially through said casing, a fan in said casing secured to said shaft, means for rotating said shaft, a conical deflector positioned to form an annular slot for the discharge of gases at the other end of said casing, and a bearing for said shaft at the rear of said deflector whereby said bearing is protected from the action of discharge gases.

2. An exhaust muffler comprising a cylindrical casing, an exhaust pipe connecting one end of said casing with an engine, a shaft extending axially through said casing, a plurality of fans in said casing secured to said shaft, means for rotating said shaft, a conical deflector positioned to form an annular slit for the discharge of gases at the other end of said casing, the base of said conical deflector having a diameter substantially the same as the diameter of said casing and a bearing for said shaft at the rear of said deflector whereby said bearing is protected from the action of the discharged gases.

3. An exhaust muffler comprising a casing, an exhaust pipe connecting one end of said casing with an engine, a shaft extending axially through said casing, a fan in said casing secured to said shaft, a pulley secured to said shaft whereby the latter may be driven from the engine, a conical asbestos backed deflector positioned to form an annular slit for the discharge of gases at the rear of said casing, the base of said conical deflector having a diameter substantially the same as the diameter of said casing, and a bearing for said shaft at the rear of said deflector whereby said bearing is protected from the action of discharged gases.

In testimony whereof we hereunto affix our signatures.

GEORGE A. BLAIN.
JACOB SCHERER.